UNITED STATES PATENT OFFICE.

PHILIPP OTT AND THILO KROEBER, OF ELBERFELD, GERMANY, ASSIGNORS TO THE FARBENFABRIKEN OF ELBERFELD COMPANY, OF NEW YORK, N. Y.

BLUE AZIN DYE.

SPECIFICATION forming part of Letters Patent No. 603,013, dated April 26, 1898.

Application filed September 14, 1897. Serial No. 651,582. (Specimens.) Patented in Germany April 15, 1893, No. 78,497; in England May 3, 1893, No. 8,898; in France June 8, 1893, No. 230,692; in Italy December 31, 1893, XXVIII, 35,092, LXVIII, 498; in Austria June 18, 1894, No. 63,659, and in Hungary June 18, 1894, No. 95,281.

*To all whom it may concern:*

Be it known that we, PHILIPP OTT and THILO KROEBER, chemists, doctors of philosophy, subjects of the German Emperor, residing at Elberfeld, Germany, (assignors to the FARBENFABRIKEN OF ELBERFELD COMPANY, of New York,) have invented certain new and useful Improvements in the Manufacture of Blue Azin Dye, (for which the Farbenfabriken, vormals Fr. Bayer & Co., of Elberfeld, Germany, has already obtained Letters Patent in Germany, No. 78,497, dated April 15, 1893; in England, No. 8,898, dated May 3, 1893; in Austria-Hungary, No. 63,659 and No. 95,281, dated June 18, 1894; in France, No. 230,692, dated June 8, 1893, and in Italy, Reg. Gen., Vol. XXVIII, No. 35,092, Reg. Att., Vol. LXVIII, No. 498, dated December 31, 1893;) and we do hereby declare the following to be an exact and clear description of our invention.

Our invention relates to the production of new blue azin dyestuffs by condensing certain sulfo-acids of the symmetrically-disubstituted 1.3 naphthylenediamin having the general formula

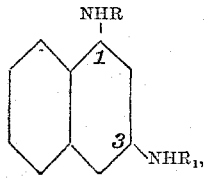

(in which formula R and $R_1$ represent either the same or different aromatic radicals, such as phenyl, tolyl, or the like) with sulfo-acids of paranitroso derivatives of aromatic amins.

Of the above-defined sulfo-acids of symmetrically-disubstituted 1.3 naphthylenediamins we use the 8.6 disulfo-acids. Valuable blue azin dyestuffs, having in chief the same chemical and dyeing properties, are obtained by condensing these sulfo-acids with sulfo-acids of paranitroso compounds of secondary or tertiary aromatic amins, such as nitrosobenzylanilinsulfo-acid, nitrosoethylbenzylanilinsulfo-acid, nitrosodibenzylanilin mono or disulfo acid, nitrosodiphenylaminsulfo-acid, nitrosomethyldiphenylaminsulfo-acid, nitrosoethlydiphenylaminsulfo-acid, or the like.

In order to carry out the new process one-and-a-half molecular proportion of the above-defined nitrososulfo-acids are allowed to act on one molecular proportion of the disubstituted naphthylenediaminsulfo-acids hereinbefore mentioned in the presence of a suitable solvent or diluent profitably with the addition of sodium acetate or of another alkaline acetate.

The coloring-matters thus obtained dye unmordanted wool in acid-baths bright-blue shades, which withstand the action of acids and alkalies and are pretty fast against the action of light. When dried and pulverized, they represent dark powders, which dissolve in water with comparative readiness, yielding blue solutions, and are soluble in concentrated sulfuric acid with a green color.

In carrying out our new process practically we can proceed as follows: Thirty kilos, by weight, of diphenylnaphthylenediaminsulfo-acid having the formula

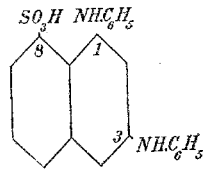

and eighteen kilos, by weight, of sodium acetate ($CH_3COONa$) are dissolved in one hundred liters of absolute alcohol at about 80° centigrade. To the resulting solution, which is kept at the said temperature, a mixture prepared from thirty-seven kilos, by weight, of pure dry nitrosoethylbenzylanilinsulfo-acid, having the formula

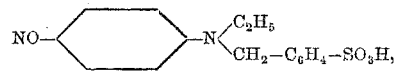

and fifty liters of alcohol is slowly added under stirring within about half an hour. On stirring the reaction mixture at the said temperature for about three hours longer the new dyestuff gradually separates in the shape of a crystalline precipitate, which is finally filtered off from the liquid without previous cooling.

The new dyestuff thus obtained is the sodium salt of the acid which probably has the following formula:

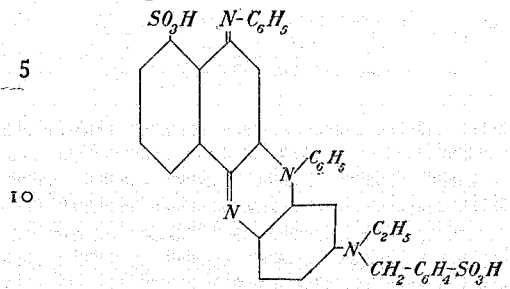

When dried and pulverized, the new coloring-matter represents a dark powder, which dissolves in water with a blue color. By concentrated sulfuric acid it is dissolved with a green color, which turns into violet on the addition of a small quantity of ice, while a dark-blue precipitate is obtained on adding a larger quantity of ice. The new dyestuff is insoluble in a ten-per-cent. solution of sodium carbonate and in strong soda-lye. It dyes unmordanted wool in acid-baths bright-blue shades, which withstand the action of acids and alkalies and are pretty fast to light.

Having now described our invention and in what manner the same is to be performed, what we claim as new, and desire to secure by Letters Patent, is—

1. The herein-described process for producing new azin dyestuffs by condensing sulfo-acids of symmetrically-disubstituted 1.3 naphthylenediamins, such as 8 mono, 6.8 di sulfo-acid, having the general formula:

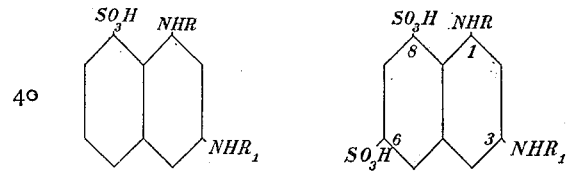

respectively, in which formula R and R' represent aromatic radicals, such as phenol, tolyl, with the sulfo-acids of paranitroso derivatives of secondary and tertiary aromatic amins, substantially as described.

2. The herein-described process for producing a new azin dyestuff, which process consists in condensing one molecular proportion of diphenylnapthylenediaminsulfo-acid of the formula

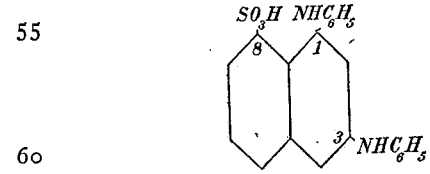

with one-and-a-half molecular proportion of nitrosoethylbenzylanilinsulfo-acid, having the formula

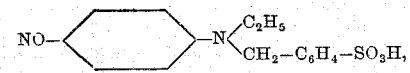

substantially as described.

3. As new articles of manufacture azin dyestuffs obtainable from sulfo-acids of symmetrically-disubstituted 1.3 naphthylenediamins, such as 8 mono, 6.8 di sulfo-acid, with sulfo-acids of paranitroso derivatives of secondary and tertiary aromatic amins, representing when dry and pulverized dark powders, dissolving in water with a blue color, soluble in concentrated sulfuric acid with a green color, dyeing unmordanted wool in acid-baths bright-blue shades which are fast to acids and alkalies and also pretty fast against the action of light, substantially as described.

4. As a new article of manufacture the specific azin dyestuff obtainable from diphenyl 1.3 naphthylenediamin 8 sulfo-acid and nitrosoethylbenzylanilinsulfo-acid, being an alkaline salt of the acid, having the formula

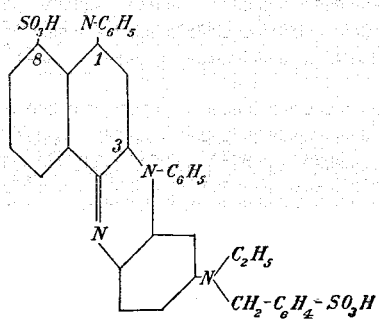

representing when dry and pulverized a dark powder, soluble in water with a blue color, dissolving in concentrated sulfuric acid with a green color which turns into violet on the addition of a small quantity of ice, while a dark-blue precipitate is obtained on adding a larger quantity of ice, insoluble in a ten-per-cent. solution of sodium carbonate and in strong soda-lye, dyeing wool in acid-baths bright-blue shades which are fast to acids and to alkalies and also pretty fast against the action of light, substantially as described.

In testimony whereof we have signed our names in the presence of two subscribing witnesses.

PHILIPP OTT.
THILO KROEBER.

Witnesses:
R. E. JAHN,
OTTO KÖNIG.

It is hereby certified that in Letters Patent No. 603,013, granted April 26, 1892, upon the application of Philipp Ott and Thilo Kroeber, of Elberfeld, Germany, for an improvement in "Blue Azin Dyes," an error appears in the printed specification requiring correction, as follows: In line 45, page 2, the word "phenol" should read *phenyl;* and that the said Letters Patent should be read with this correction therein that the same may conform to the record of the case in the Patent Office.

Signed, countersigned, and sealed this 10th day of May, A. D., 1898.

[SEAL.]

WEBSTER DAVIS,
*Assistant Secretary of the Interior.*

Countersigned:
   C. H. DUELL,
      *Commissioner of Patents.*